(12) United States Patent
Winter et al.

(10) Patent No.: US 6,625,388 B2
(45) Date of Patent: Sep. 23, 2003

(54) METHOD AND DEVICE FOR RECORDING SUB-TITLES

(75) Inventors: Marco Winter, Hannover (DE); Dirk Adolph, Ronnenberg (DE)

(73) Assignee: Thomson Licensing S.A., Boulogne (FR)

( * ) Notice: Subject to any disclaimer, the term of this patent is extended or adjusted under 35 U.S.C. 154(b) by 21 days.

(21) Appl. No.: 09/901,404

(22) Filed: Jul. 9, 2001

(65) Prior Publication Data

US 2002/0006271 A1 Jan. 17, 2002

(30) Foreign Application Priority Data

Jul. 14, 2000 (EP) .............................. 00115273

(51) Int. Cl.⁷ ............................................... H04N 5/91
(52) U.S. Cl. ......................... 386/83; 386/95; 386/125; 386/126
(58) Field of Search .................. 386/125, 126, 386/95, 83, 46, 98, 99, 124; H04N 5/91

(56) References Cited

U.S. PATENT DOCUMENTS

| | | | | |
|---|---|---|---|---|
| 5,565,997 A | * | 10/1996 | Terry ............................ | 386/46 |
| 5,819,003 A | | 10/1998 | Hirayama et al. ............ | 386/95 |
| 5,905,844 A | * | 5/1999 | Kimura et al. ................ | 386/95 |
| 5,987,214 A | * | 11/1999 | Iwamura ....................... | 386/95 |
| 6,128,434 A | * | 10/2000 | Hirayama et al. ............ | 386/97 |
| 6,148,139 A | * | 11/2000 | Cookson et al. .............. | 386/95 |
| 6,259,858 B1 | * | 7/2001 | Ando et al. .................... | 386/95 |
| 6,345,147 B1 | * | 2/2002 | Mimura et al. ............... | 386/97 |

FOREIGN PATENT DOCUMENTS

EP 0788106 A1 8/1997 ........... G11B/27/00

OTHER PUBLICATIONS

Search Report.

* cited by examiner

*Primary Examiner*—Vincent Boccio
*Assistant Examiner*—James A Fletcher
(74) *Attorney, Agent, or Firm*—Joseph S. Tripoli; Harvey D. Fried; Francis A. Davenport (57) ABSTRACT

Video recording according to the DVD-VR Specification allows to record only one sub-picture stream. Therefore, a new technique is provided in order to be able to record at least two different sub-title streams in such a way that the sub-pictures of the different streams may be displayed optionally. A first sub-picture stream is directly copied to the DVD-VR disc, whereas a second or third sub-picture stream is transcoded to Teletext format so that the data can be included into the video stream to be recorded on the DVD-VR disc. Thus, several sub-titles are available during replaying a DVD-VR disc.

18 Claims, 6 Drawing Sheets

Fig. 1

Sub-picture Color look-up table

| 0 | Y=75; Cr=240; Cb=92 |
| 1 | Y=45; Cr=105; Cb=235 |
| 2 | ... |
| ... | ... |

Fig. 2

Teletext colors

| black | Y=16; Cr=128; Cb=128 |
| red | Y=81; Cr=240; Cb=90 |
| green | ... |
| yellow | ... |
| blue | Y=41; Cr=110; Cb=240 |
| magenta | ... |
| zyan | ... |
| white | Y=235; Cr=128; Cb=128 |

METHOD AND DEVICE FOR RECORDING SUB-TITLES

FIELD OF THE INVENTION

The present invention relates to a method of recording data on a recording medium, wherein the data include MPEG video data and first sub-title data. Furthermore, the present invention relates to a device for recording these data on a recording medium.

BACKGROUND OF THE INVENTION

According to the generally available DVD standard the MPEG format provides up to 32 sub-picture streams. Usually, such sub-picture streams are used to record various sub-titles, e.g. in different languages, on a DVD disc. Thus, when replaying a DVD disc the user has the possibility to choose a specific sub-title which is displayed on the video screen together with video data.

The recording of a plurality of sub-titles by sub-picture streams on a DVD disc requires a complex recording technique. Therefore, video recorders have been developed, the recording technique of which is less complex and less expensive but which can only record one sub-picture stream. A corresponding DVD-VR standard has been defined which describes the specific video recording on DVD discs. The user replaying the video signals stored on the DVD-VR disc has the possibility to switch on and off the sub-title of the one sub-picture stream. However, he does not have the possibility to choose another sub-title, as he can choose when replaying a DVD disc.

Moreover, according to the state of art, it is possible to "burn" a sub-title into a video stream. However, such a sub-title is always visible when playing back the corresponding video part.

SUMMARY OF THE INVENTION

In view of the above-described disadvantages it is an object of the present invention to provide a method and device for making available more than one sub-title to the user when replaying a DVD-VR disc.

According to the present invention this object is solved by a method of recording data on a recording medium, wherein the data include MPEG video data and first sub-title data, with a step of storing at least second sub-title data as character based information within the MPEG video data.

The advantage of storing additional sub-title data in the MPEG video stream is, that additional sub-title information is available to the user if he has a corresponding decoder which is able to extract these additional sub-title data from the MPEG video stream. The features of individually using the sub-title data of the sub-picture stream are not affected by storing the additional sub-title data within the MPEG video stream.

According to an enhanced DVD-VR standard it may be possible to record one or more additional sub-picture streams on a DVD-VR disc. Thus, more than one sub-title stream may be recorded as sub-picture stream on the disc. Alternatively, more than one sub-title stream may be recorded within the MPEG video stream. Closed Caption, for example, provides such feature of storing more than one sub-title.

Preferably, the sub-title data obtained from a sub-picture stream are stored as Teletext, Videotext or Closed Caption. The specific advantage of using the Teletext, Videotext or Closed Caption format is that most television sets currently available on the market are already provided with corresponding decoders. Therefore, a user having a DVD player and a TV-set with a Teletext decoder has the possibility to conventionally activate a first sub-title stream stored in a sub-picture stream on the DVD-VR disc and, furthermore, he can activate the sub-title stream stored within the video stream as usual Teletext by switching on the Teletext decoder.

In a preferred embodiment the character based sub-title information is labelled by a flag inside the sub-title data, so that corresponding data can be automatically identified as sub-title information.

Furthermore, as already described above the video and sub-title data may be recorded on the DVD disc together with further data as digital information.

MPEG video streams provide space for storing user data in picture layers or GOP (group of pictures) layers. This space is preferably used to transmit or record Teletext, Videotext or Closed Caption data.

The method of recording sub-title data may be improved by analysing the at least one incoming sub-picture stream. Such analysis is necessary for improving a transformation from the sub-picture format into the Teletext, Videotext or Closed Caption format.

As already described above, DVD-VR used according to the present invention provides the possibility of recording at least two sub-title streams. Both sub-title streams may be output from a DVD disc. The first sub-title stream may be stored conventionally within a sub-picture stream. The second sub-title stream may be stored for example as Teletext. However, one of the sub-title streams or all of them may also be individually input by the user, for example with a keyboard. Thus, the user can input individual data streams to be stored on the DVD-VR disc either as Teletext or as sub-picture data. E.g. the user can input sub-titles personally translated to another language, generate a sub-title stream for another target group or record information, which is automatically generated and related to the content of the video stream, like the current date and time.

Moreover, according to the present invention the above described methods may be implemented on a device for recording data on a recording medium, wherein the data include MPEG video data and first sub-title data, with recording means for recording at least second sub-title data as character based information within the MPEG video data. Additional transcoding means may be provided for transcoding sub-title data from the MPEG sub-picture format to Teletext, Videotext or Closed Caption format.

The inventive method is usually formulated as computer program so that it may run on a plurality of hardware devices. For installation the computer program usually will be stored on recording media like data discs.

BRIEF DESCRIPTION OF THE DRAWINGS

Exemplary embodiments of the invention are illustrated in the drawings and are explained in more detail in the following description.

In the Figures.

DETAILED DESCRIPTION OF PREFERED EMBODIMENTS

Figure 1:
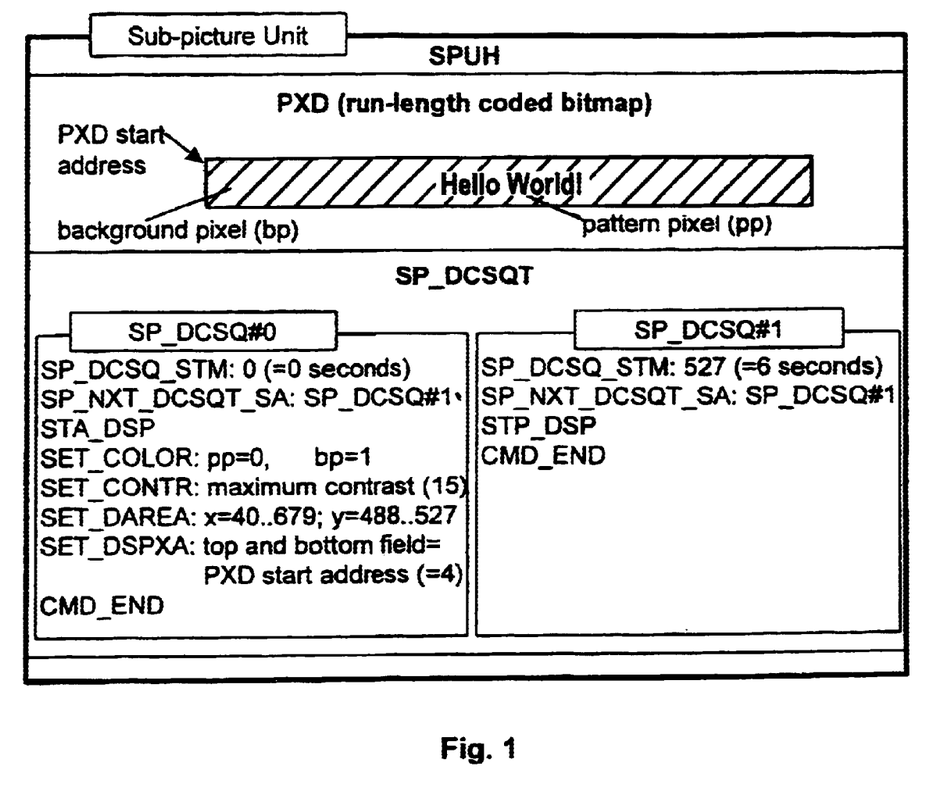
FIG. 1 shows a sub-picture unit including sub-title information.

For recording plural sub-titles on a DVD-VR disc according to the present invention a sequence of MPEG sub-picture units will be transcoded to Teletext format and then integrated into a MPEG video stream. Such a sub-picture unit is shown in FIG. 1. The general structure of a sub-picture unit(SPU)is specified in the DVD standard, DVD Specifications for Read-Only Disc, part 3, Video Specification, version 1.0, Aug. 3, 1996, chapter 5.4.3 Sub-picture Unit (SPU). Accordingly the sub-picture unit comprises the sub-picture unit header (SPUH), pixel data (PXD) and display control sequence table (SP_DCSQT) which includes sub-picture display control sequences (SP_DCSQ). SP_DCSQ describes the content of the display control on the pixel data. Each SP_DCSQ is sequentially recorded, attached to each other.

FIG. 1 shows an example of a sub-picture unit as it may be subjected to transcoding into a Teletext signal. As prescribed by the standard also the concrete sub-picture unit of this example starts with a sub-picture header (SPUH) including control information. The following part PXD represents the pixel data field. In the present case the pixel data are run-length coded bitmap data. The grey graphic field in FIG. 1 exemplarily represents a sub-title graphic, which is stored as bitmap in the PXD. As described above the PXD is followed by the display control sequence table (SP_DCSQT). The SP_DCSQT may include several display control sequences (SP_DCSQ). In the case of FIG. 1 the SP_DCSQT contains two display control sequences, SP_DCSQ#0 and SP_DCSQ#1. An example of the contents of the display control sequences is also given in FIG. 1. Accordingly, a start time (SP_DCSQ_STM) of SP_DCSQ#0 is set to 0. This means that a control sequence starts at the fictitious time 0. Furthermore, the start address of the next SP_DCSQ (SP_NXT_DCSQT_SA) is set to SP_DCSQ#1 shown in the right half of FIG. 1. The display of the sub-picture unit is started by the command STA_DSP. The color of each pixel type for the pixel data is set by the command SET_COLOR. In the present case the color of the background pixels (bp) is set to 1 and the color of the pattern pixels (pp) is set to 0.

The contrast mixture ratio between each pixel of the pixel data and the main picture is set by the command SET_CONTR. In the present case this contrast is set to maximum.

The sub-picture displaying the sub-title has to be placed within the main picture. Therefore, the display area of the pixel data are set by a rectangle with command SET_DAREA. This command allows to set the display area individually by x and y coordinates. In order to determine the part of the PXD which is to be displayed as sub-picture the address of the first pixel data used for displaying is set by the command SET_DSPXA. The corresponding PXD start address is shown in the PXD graphic in FIG. 1.

The sub-picture display control sequence SP_DCSQ#0 is terminated by the command CMD_END like each SP_DCSQ.

The second and last display control sequence SP_DCSQ#1 of this exemplary SP_DCSQT is shown in the right half of FIG. 1. Accordingly, the execution stop time is set to 527 units corresponding to 6 seconds. The following command relating to the start address of the next sub-picture display control sequence does not produce any effect in the present case since SP_DCSQ#1 is the last one of the SP_DCSQT. The command STP_DSP serves to stop the display of a sub-picture unit. As already described above the command CMD_END terminates the display control sequence.

The above described sub-picture unit is a part of a video object unit according to the DVD standard.

Figure 2:
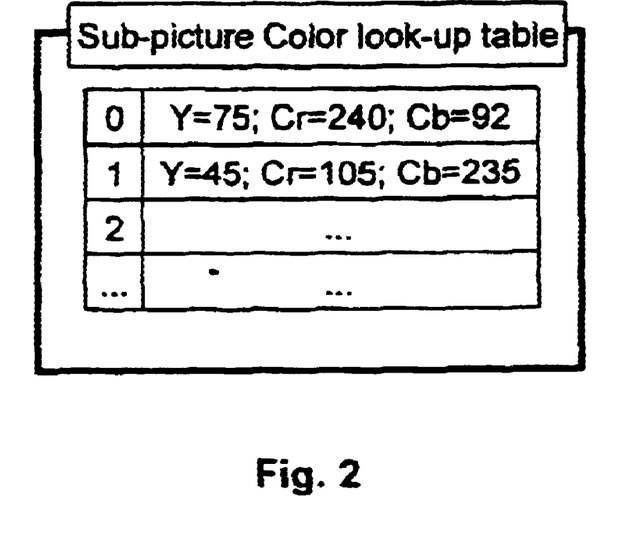
FIG. 2 shows a typical color look-up table for sub-picture data.

FIG. 2 shows a sub-picture color look-up table which represents a relation between a code number and a specific color. In the present case the pattern pixel color has been set to color "0" (compare FIG. 1). The corresponding color coordinates for color "0" can be obtained from the first row of the sub-picture color look-up table of FIG. 2. Furthermore, the background pixel color is set to color "1". The corresponding color coordinates are shown in the second row of the sub-picture color look-up table. In such a way the pattern pixels and background pixels can be set to whatever color.

The principle of the present invention is to transform data encoded to the MPEG sub-picture format to data encoded to the Teletext, Videotext or Closed Caption format. Thus, all of the sub-picture display control sequences have to be transformed to the Teletext format, for example. This transformation will be exemplarily explained on the basis of the transformation of the color setting.

Figure 3:
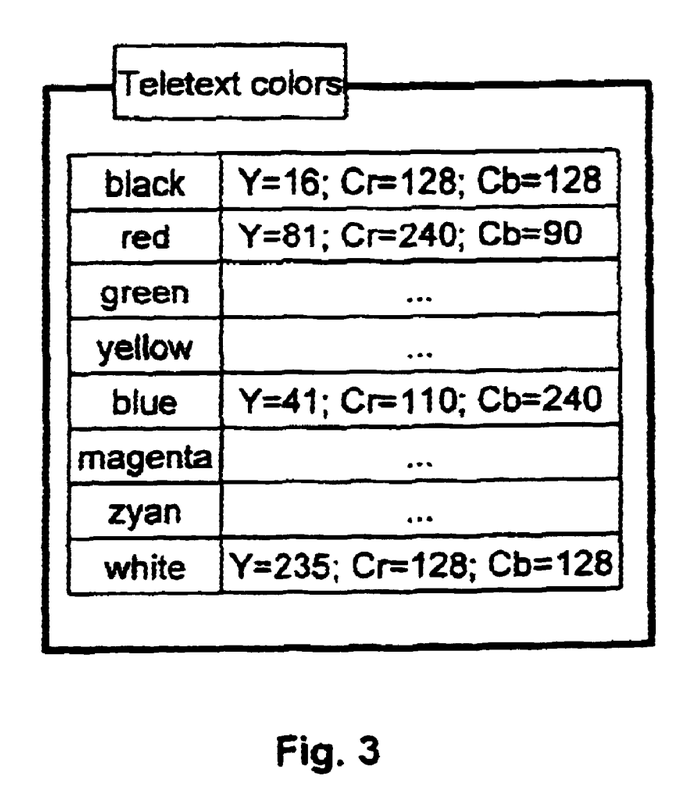
FIG. 3 shows a typical table of Teletext colors.

The Teletext standard provides few well defined colors as shown FIG. 3. In general these colors are not identical with those of the color look-up table of the FIG. 2. Therefore, during the process of transcoding or transformation the colors of the sub-pictures have to be compared with those of the Teletext. The color of the Teletext which is most similar to the color of the sub-picture is assigned to this sub-picture color. In the present case color "0" of the sub-pictures is closest to color "red" of the Teletext. Similarly, color "1" of the sub-picture is closest to color "blue" of the Teletext. Consequently, the pattern pixel color of the sub-picture unit will be recorded as red Teletext color and the background pixel color of the sub-picture unit will be recorded as blue Teletext color. In any case it is verified that the pattern pixel color and the background pixel color are also different in the Teletext.

Another example for the transformation of the sub-picture display control sequences to Teletext standard is given by means of setting the area of the sub-title within the main picture. According to the sub-picture unit of FIG. 1 SET_DAREA is set to x=40 . . . 679; y=488 . . . 527. The transcoder has to find the Teletext row which essentially corresponds to that area defined in the sub-picture unit. In the present case this area corresponds to Teletext row 22. Thus, the sub-title "Hello World!"will be displayed in Teletext row 22.

The transformation of a DVD sub-picture into the Teletext sub-title format requires the analysis of the sub-picture for the following reason. A sub-picture unit comprises a run-length compressed bit map data unit and additional presentation commands. The presentation commands of the sub-picture unit may be transformed directly to corresponding Teletext commands. However, in the sub-picture format the sub-title information is stored as bit map data whereas in the Teletext format the sub-title information is stored as background and characters. Therefore, pattern recognition of the painted text is necessary for the transformation of the sub-title from the sub-picture format to the Teletext format.

Figure 4:
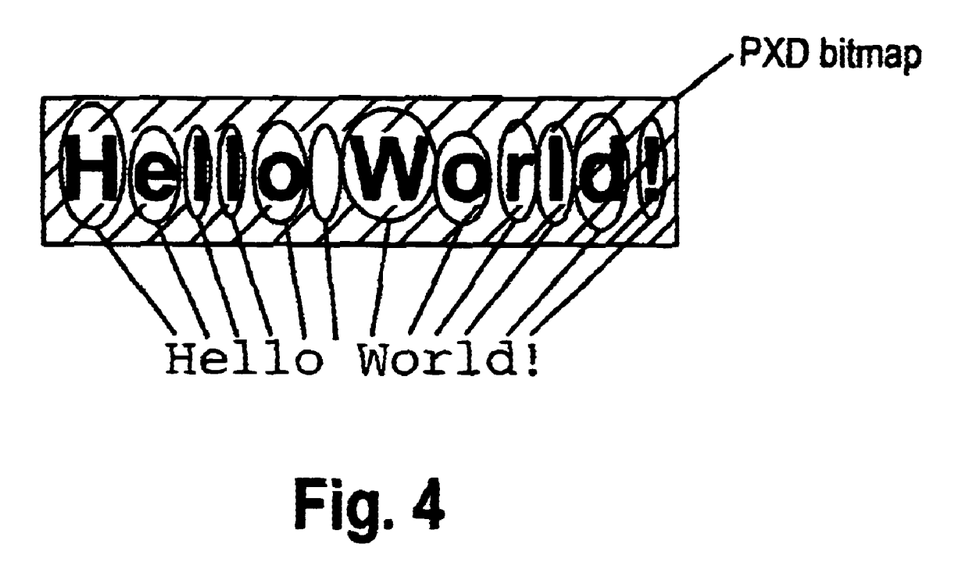
FIG. 4 shows the principle of pattern recognition.

Pattern recognition of computer generated text as shown in FIG. 4 is a well known technique. In the case of DVD sub-pictures the pattern recognition is simplified by the fact that only four different pixel types are used for DVD sub-pictures. Furthermore, the clear assignment of sub-picture pixels for special uses namely background, pattern, emphasis 1 and emphasis 2 pixels, additionally serves for simplified pattern recognition. As a result a pixel data bit map of the sub-picture unit of the present case is transformed by pattern recognition into the character sequence "Hello World!".

Figure 5:
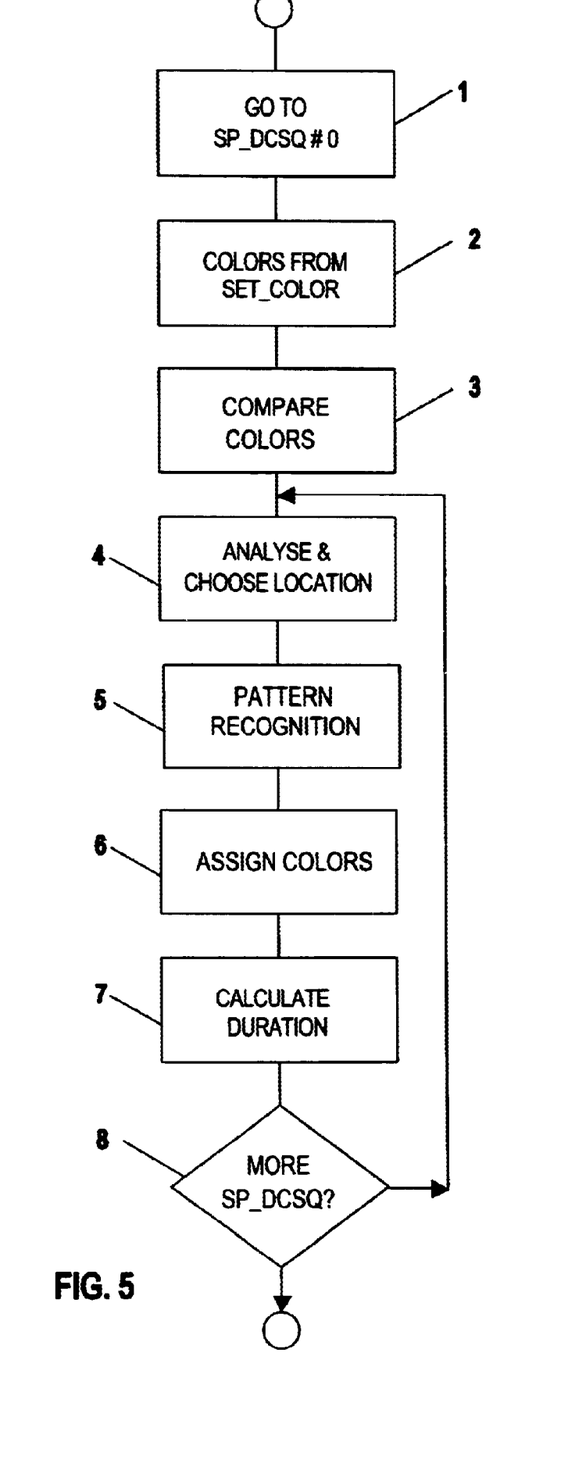
FIG. 5 shows a flowchart for analysing sub-picture data according to the present invention.

As already mentioned above the sub-picture stream has to be analysed in order to transform the data to Teletext format. Such an analyses may be performed according to the flow chart shown in FIG. 5. The analysis of FIG. 5 can be used for most kinds of sub-title sub-pictures with two SP_DCSQs. Generally, a sub-title sub-picture unit does not include a command (CHG_COLCON) to change the color and contrast of pixel data. Thus, the following steps are performed during analysis:

Step 1 contains the command to go to the sub-picture display control sequence SP_DCSQ#0. In step 2 the colors used are obtained from the command SET_COLOR. In step 3 the assigned sub-picture look-up table colors are compared with Teletext colors (red, green, yellow, . . . ). Furthermore, the Teletext colors are assigned to the sub-picture colors, which are used in the sub-picture stream to be analysed, as definitely as possible. Such assignment guaranties in most cases that the Teletext colors are similar to those of the sub-picture. In step 4 the SET_DAREA values are analysed in order to obtain the screen location of the sub-picture. After that, that Teletext row is chosen which comes closed to the screen location of the sub-picture. In step 5 the pattern recognition of the run-length coded PXD bit map is started. The SET_DSPXA values are used to detect the run-length coded bit map start positions of the top and button field inside the PXD. The SET_DAREA values are used to obtain the number of pixels per line. After that, the bit map is analysed with a pattern recognition algorithm to detect the characters of the bit map. In step 6 the Teletext colors matching to the sub-picture colors are assigned to the characters and the background of the sub-title, respectively. Finally, in step 7 the end of the presentation of the sub-picture is obtained from the SP_DCSQ_STM value of the SP_DCSQ containing the STP DSP command in the last SP_DCSQ. The formula to calculate the duration in units of seconds is SP_DCSQ_STM*64/5625. The Teletext sub-title is cleared after this presentation time, i.e. an empty Teletext page or the next Teletext sub-title is displayed on the screen.

In the case of Karaoke those passages or words of a sub-title are emphasized which have to be sung at the present moment. For this case steps 2 and 7 have to be changed as follows: In step 2 all SET_COLOR commands and all CHG_COLCON commands of the sub-picture unit have to be read out. In step 7 the presentation steps of the sub-title, i.e. the Karaoke emphasizing steps have to be looked for until the presentation end of the whole sub-picture. The Karaoke emphasizing steps are defined by SP_DCSQ_STM values of the SP_DCSQs of each new CHG COLCON command. As described above the presentation end of the sub-picture is defined by the SP_DCSQ_STM value of the last SP_PCSQ. The formula for calculating the duration of each steps in seconds relative to the start of the sub-picture unit is the same as that above. After each presentation step a new Teletext sub-title with another emphasized word or an empty Teletext page has to be displayed or the next Teletext sub-title has to be sent.

The analysis of the sub-picture data has to be further changed if the sub-picture unit provides multiple sub-titles. Especially, steps 2 and 7 have to be changed like in the case of Karaoke and, additionally, as there are multiple sub-titles the presentation end of the sub-picture is defined by the SP_DCSQ_STM value of the next occurring SP_DCSQ containing the STP DSP command. Furthermore, as indicated in FIG. 5 by dash-lines the multiple sub-titles of a sub-picture unit require an additional step 8 with the following branching condition: If there exist one or more SP_DCSQs after the SP_DCSQ being presently analysed containing a STP_DSP command, go to the SP_DCSQ just behind this SP DCSQ containing the STP_DSP command and continue with step 4.

The analysis of the sub-picture stream is the basis for transcoding sub-picture units into Teletext, Videotext or Closed Caption. Since the sub-picture units are part of a sub-picture stream the respective commands of the sub-picture units will have to be analysed permanently due to their changes. The resulting effects are shown below:

a) Each occurring SET DAREA command may need a change of the sub-title location on the Teletext screen.

b) Each occurring SET DSPXA command may need a new execution of the pattern recognition process.

c) Each occurring SET_COLOR command may need a change of the text color.

d) Each occurring CHG_COLCON command may need a change of the text color of some characters.

e) Each occurring SET_CONTR command may need a dis- or enabling of the Teletext sub-title.

f) Each occurring STP_DSP command needs a disabling of the Teletext sub-title.

g) Each occurring STA_DSP command needs an enabling of the Teletext sub-title.

Usually, each one of the events a) to g) above requires a change of the present Teletext sub-title page.

The transcoding process forms a data structure as required by the Teletext, video text or Closed Caption standard. In the present case the transcoding leads to a Teletext data structure as shown in FIGS. 6 and 7, showing two representative rows of the Teletext.

Figure 6:
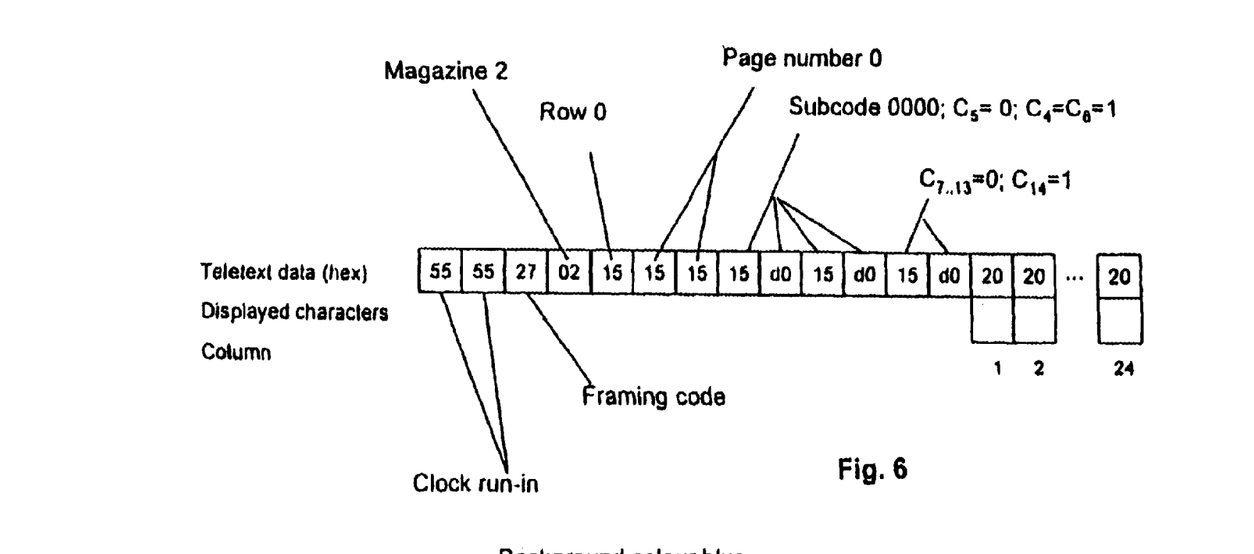
FIG. 6 shows a Teletext row 0 corresponding to the sub-picture unit of FIG. 1.
Figure 7:
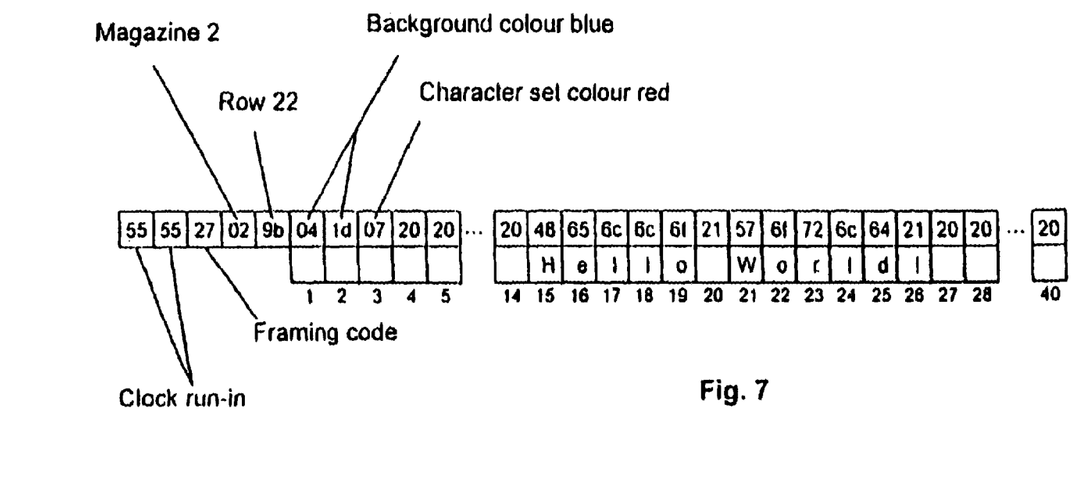
FIG. 7 shows a Teletext row 22 corresponding to the sub-picture unit of FIG. 1.

FIG. 6 shows a Teletext row 0 obtained from the sub-picture unit of FIG. 1. The general structure of Teletext signals is provided by the international Teletext standard. Accordingly, the Teletext signal for one page includes 24 rows. The first row 0, like a header, includes control information. The row is formed by a sequence of hexadecimal numbers of two digits each. Thus, each code number is represented by 8 bit. At the beginning of the row the first three numbers representing the clock run-in and the framing code are fixedly set for a given type of Teletext. The following magazine number "2" represents the hundred of the Teletext page number. The next Teletext number represents the number of the row. The next two numbers represent the ten and the unit of the page number of the Teletext. The number of a sub-page of a Teletext page is coded within the next four hexadecimal numbers. Control codes for sub-title, new page etc. follow.

The next rows of the Teletext signal contain specific information provided by the broadcasting facility. Typically, sub-title information is sent within the last view rows. An example for such sub-title Teletext row is shown in FIG. 3 on the basis of a row 22. The row 22 also consists of a sequence of hexadecimal numbers. The beginning of the row 22 is identical with that of row 0, namely including the clock run-in and the framing code. The next hexadecimal numbers represent the magazine and the row numbers. The next numbers are codes for the background color, the character set color and the characters to be displayed.

As can be seen from the above, a Teletext signal is a sequence of hexadecimal numbers separated in several rows. Each code word has a specific meaning like page number, sub-title or background color.

The above-described transcoding process for transcoding sub-picture data to Teletext data is the fundamental basis for including a sub-title stream into an MPEG video stream according to the present invention. This inclusion of sub-title stream into the video stream will be explained by means of the following example in connection with FIG. 8.

A DVD video disc contains a movie with two sub-title streams, namely an English sub-title stream SP#1 data and a German sub-title stream SP#2 data. This movie shall be copied to a DVD-VR disc. The first sub-title stream, the English one, is stored on the DVD video disc as sub-picture stream and will be copied to the DVD-VR disc as sub-picture stream SP#1 data (compare FIG. 8). The second sub-title stream in German language will be transcoded into Teletext sub-title data and recorded as Teletext stream as specified in the DVD-VR Specification, Version 1.0. As a result the data units of the audio and video streams AV data and those of the second sub-picture stream SP#2 data of the DVD video data are combined to an Audio-Video-Teletext stream AV & Teletext data of the DVD-VR data. Furthermore, the first sub-picture stream SP#1 data of the DVD video data is copied without transcoding to the sub-picture stream SP#1 data of the DVD-VR data.

Figure 8:
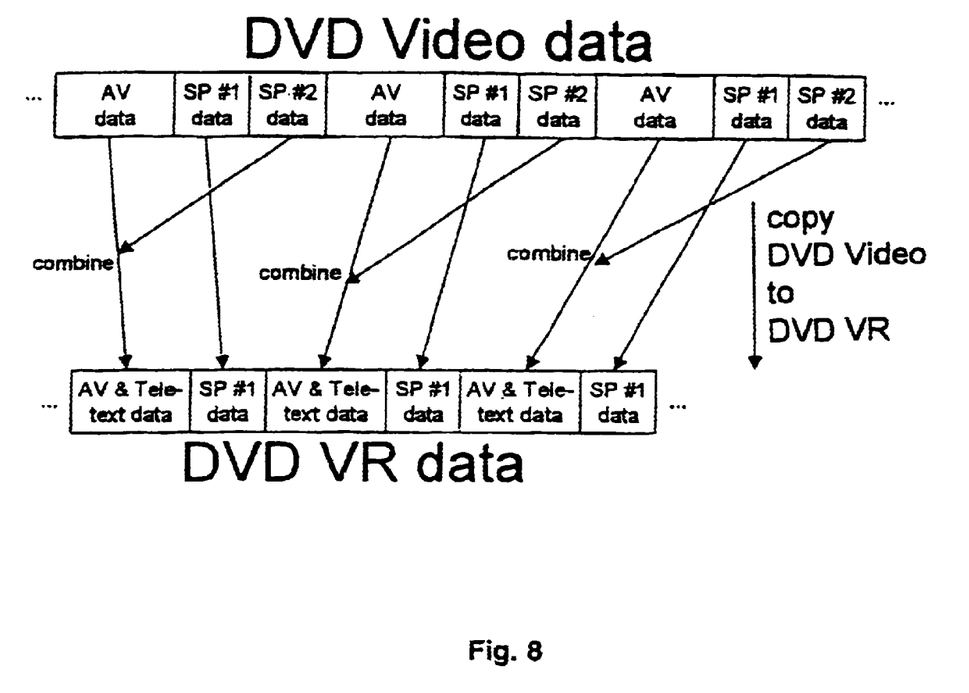
FIG. 8 shows the integration of sub-title data into MPEG video data according to the present invention.

In summary, the present invention provides the advantage that, compared to conventional DVD-VR, two independent sub-title streams per video object can be recorded on the DVD-VR disc instead of only one. Furthermore, the data transformation according to the present invention shown in FIG. 8 is totally compatible to the DVD-VR Specification. Finally, the present invention may be employed without additional hardware, wherein the complete data transformation is performed by software only.

What is claimed is:

1. Method of recording video data and sub-title data, wherein said sub-title data are arranged in sub-picture streams, comprising the steps of:
   recording sub-title data arranged in a first sub-picture stream as a sub-picture stream;
   analysing sub-title data arranged in a second sub-picture stream;
   transforming said analysed sub-title data into character based information; and,
   recording said character based information.

2. Method according to claim 1, wherein said transforming step comprises including said character based information within said video data.

3. Method according to claim 1, wherein said analyzing step comprises encoding said sub-title data as one of Teletext, Videotext or Closed Caption data.

4. Method according to claim 1, further comprising the step of labelling said character based sub-title information preferably by a flag inside said sub-title data.

5. Method according to claim 1, wherein said video and sub-title data are recorded as digital information on a DVD disc.

6. Method according to claim 1, wherein said video data are encoded according to an MPEG video standard and include user data of a picture layer or a GOP layer and wherein said second sub-title data are stored within said user data.

7. Method according to claim 1, wherein said one or more first sub-title data are recorded as sub-picture stream/streams.

8. Method according to claim 1, wherein said sub-title data include user defined sub-title information.

9. Device for recording video data and sub-title data, wherein said sub-title data are arranged in sub-picture streams, comprising;
   means for recording said character based information;
   means for recording sub-title data arranged in a first sub-picture stream as a sub-picture stream;
   means for analysing sub-title data arranged in a second sub-picture stream;
   means for transforming said analysed sub-title data into character based information; and,
   means for recording said character based information.

10. Device according to claim 9, wherein said means for recording said character based information comprises means for including said character based information within said video data.

11. Device according to claim 9, wherein said transforming means comprises an encoder for encoding said analysed sub-title data into one of Teletext, Videotext or Closed Caption data.

12. Device according to claim 9, further comprising labelling means for labelling said character based sub-title information preferably by a flag inside said sub-title data.

13. Device according to claim 9, wherein said recording means include means for recording at least said video and sub-title data as digital information on a DVD disc.

14. Device according to claim 9, further comprising means for inserting the character based sub-title information into the user data of a picture layer or a GOP layer of said video data, which are encoded according to an MPEG video standard.

15. Device according to claim 9, further comprising means for recording said one or more first sub-title data as sub-picture stream/streams.

16. Device according to claim 9, further comprising means for entering user defined sub-title information into said sub-title data.

17. Computer program product with program steps according to claim 1.

18. Recording medium comprising a computer program according to claim 17.

* * * * *